United States Patent
Lyu et al.

(10) Patent No.: US 12,119,002 B1
(45) Date of Patent: *Oct. 15, 2024

(54) SYSTEM AND METHOD OF FACILITATING HUMAN INTERACTIONS WITH PRODUCTS AND SERVICES OVER A NETWORK

(71) Applicant: Rabbit Inc., Bell Canyon, CA (US)

(72) Inventors: Cheng Lyu, Los Angeles, CA (US); Peiyuan Liao, Los Angeles, CA (US); Zhuoheng Yang, Jersey City, NJ (US)

(73) Assignee: Rabbit Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,947

(22) Filed: Dec. 21, 2023

Related U.S. Application Data

(63) Continuation of application No. 18/471,932, filed on Sep. 21, 2023, now Pat. No. 11,908,476.

(51) Int. Cl.
| | |
|---|---|
| *G10L 15/22* | (2006.01) |
| *G10L 13/08* | (2013.01) |
| *G10L 15/04* | (2013.01) |
| *G10L 15/18* | (2013.01) |
| *G10L 15/26* | (2006.01) |

(52) U.S. Cl.
CPC .............. *G10L 15/22* (2013.01); *G10L 13/08* (2013.01); *G10L 15/04* (2013.01); *G10L 15/1822* (2013.01); *G10L 15/26* (2013.01); *G10L 2015/223* (2013.01)

(58) Field of Classification Search
CPC ......... G10L 15/22; G10L 13/08; G10L 15/04; G10L 15/1822; G10L 15/26; G10L 2015/223
See application file for complete search history.

(56) References Cited

U.S. PATENT DOCUMENTS

| | | |
|---|---|---|
| 10,559,299 B1 | 2/2020 | Arel et al. |
| 10,971,157 B2 | 4/2021 | Willett et al. |
| 11,386,887 B1 | 7/2022 | Teng et al. |
| 11,908,476 B1 * | 2/2024 | Lyu .......... G10L 15/04 |
| 2006/0085187 A1 | 4/2006 | Barquilla |
| 2006/0190252 A1 | 8/2006 | Starkie |
| 2010/0004964 A1 * | 1/2010 | Heidasch .......... G06Q 10/06 705/7.27 |
| 2012/0192069 A1 * | 7/2012 | Zhang ............ G06F 9/45512 715/704 |
| 2015/0054731 A1 * | 2/2015 | Mun ............ G06F 3/017 345/156 |
| 2017/0018270 A1 | 1/2017 | Min |
| 2017/0255445 A1 * | 9/2017 | Seolas ........... G06F 8/38 |
| 2019/0267001 A1 | 8/2019 | Byun et al. |
| 2020/0311210 A1 | 10/2020 | Nama et al. |
| 2020/0320984 A1 | 10/2020 | Kuczmarski et al. |
| 2021/0090575 A1 | 3/2021 | Mahmood et al. |
| 2022/0277747 A1 * | 9/2022 | Pair .......... G06F 3/167 |

OTHER PUBLICATIONS

International Search Report and Written Opinion mailed May 10, 2024 in PCT/US2024/15120.

* cited by examiner

*Primary Examiner* — Abul K Azad
(74) *Attorney, Agent, or Firm* — Enable IP, P.C.

(57) ABSTRACT

An artificial intelligence enabled system is disclosed. The system includes a core component for enabling AI-powered interactions between the system and its users and one or more agents that understand user intent and automatically interact with products and services on the web and/or in the physical world through imitation of a human user.

15 Claims, 9 Drawing Sheets

SYSTEM AND METHOD OF FACILITATING HUMAN INTERACTIONS WITH PRODUCTS AND SERVICES OVER A NETWORK

FIELD

This relates generally to an artificial intelligence powered system, and more particularly, to an artificial intelligence (AI) enabled operating system (OS) that includes a core component for enabling AI-powered interactions between the OS and its users and one or more agents that understand user intent and automatically interact with products and services on the web and/or in the physical world through imitation.

BACKGROUND

Artificial intelligence (AI) has had tremendous advancements in recent years. Chatbots built on large language models (LLMs), a computer algorithm that processes natural language inputs and predicts the next word based on what it has seen, have gained large popularity in a short amount of time. Nevertheless, it is still difficult to integrate existing AIs, however complex, into an operating system (OS), due to the following difficulties.

Delivery. Existing deployment and serving of LLMs are limited by slow, synchronous, and text-first interfaces. These models are often used for throughput-demanding tasks, such as code editing and writing assistance, rather than low-latency tasks. While output text streaming is possible, the current user interface and experience are outdated and lack the technical sophistication of multimedia content delivery.

Intention. The role of an AI inside an operating system is to enable natural-language-based control of its services, which involves structure understanding of user intention. Human intentions are deeply personal, have layers, may be incomplete, and volatile. Existing operating systems cannot translate a raw user request into actionable steps and service invocations available to the operating systems.

Interface. Existing AI systems do not comprehend human-oriented interfaces, which are presented by the operating system. Without understanding how to operate these interfaces, an AI is incapable of working with users along with an OS.

Interaction. Existing AI systems are incapable of achieving an objective in an operating system to fulfill user requests in a humane way. They are prone to produce behaviors that are unsafe, inefficient, and distinctively robotic.

SUMMARY

In general, this relates to systems and methods of facilitation human interactions with computer systems, and systems and methods of facilitation of algorithmic interactions with web and computer applications. More specifically, embodiments of the disclosure relate to an artificial intelligence ("AI") powered system (e.g., an operating system or "OS") that can power devices and provide natural-language-based user experiences that are more intuitive, friendly, and powerful than those offered by existing systems. Contained within are the following components: (1) an agent that understands complex user intent, automatically searches, filters, and combines information to present as knowledge, and interacts with products and services on the web and in the physical world through imitation; and (2) a cloud infrastructure that can spin up hundreds of AIs, allowing them to interact with each other and millions of users in real time across voice, visual, and text interfaces and a wide range of hardware and software platforms.

DETAILED DESCRIPTION

Embodiments of the present disclosure will be described below in conjunction with the accompanying drawings, but it should be appreciated by those skilled in the art that the embodiments described below are exemplary, rather than exhaustive. They are only used to illustrate the present disclosure and should not be regarded as limiting the scope of the present disclosure. All other embodiments obtained by those of ordinary skill in the art without creative efforts based on the embodiments disclosed herein shall fall within the scope of the present disclosure.

Figure 1:
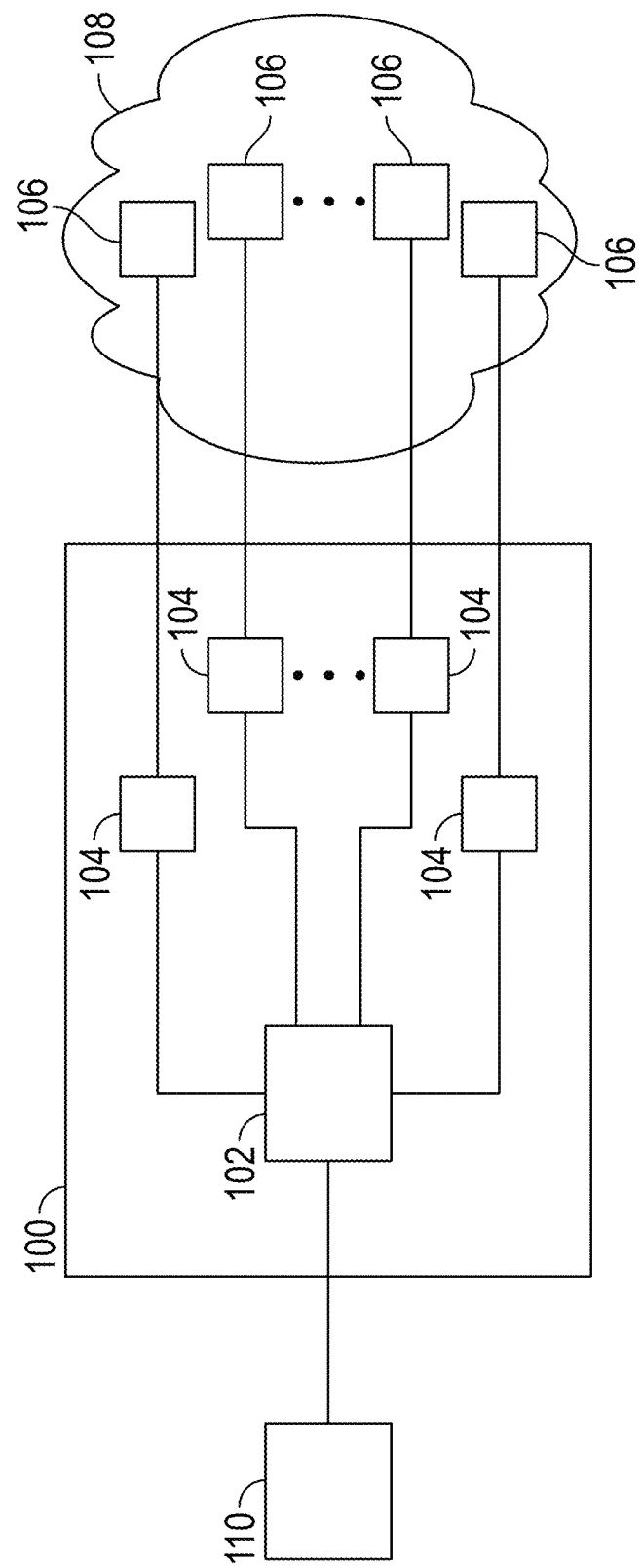
FIG. 1 is a block diagram illustrating the main components of an operating system facilitating user interaction with applications over a network, according to an embodiment of the disclosure.

FIG. 1 illustrates an embodiment of the operating system 100, according to an embodiment of the disclosure. The operating system includes two main components or modules. The terms "component" and "module" are used interchangeably in this document. The terms "model" and "layer" can also have the same meanings as the terms "module" or "component." Components, modules, models, and layers can be implemented in software, hardware, firmware, or combination thereof. The first component, core component 102 includes an infrastructure that can spin up hundreds of artificial intelligence ("AI") systems allowing them to interact with each other and a large number of users in real time across voice, visual, and text interfaces and a wide range of hardware and software platforms. The second component, agent 104 understands complex user intent, automatically searches, filters, and combines information to present as knowledge, and interacts with products and services on the internet and in the physical world through human behavior imitation. Core component 102 can communicate with one or more agents 104 and each agent 104 can interact with at least one target app 106 on the internet 108 (or any other types of networks).

Core component 102 receives user input 110, processes the user input using AI systems to determine user intentions, and selects one or more agents based on the user intentions. The selected agent(s) 104 initiates interaction with products and/or services over a network to achieve goals that satisfy the user's intentions. Embodiments of the system 100 reduce the amount of user input required to interact with the providers of the products and/or services desired by the user. Instead, it provides an intelligent way of utilizing AI systems to imitate a human user's behavior with the providers.

Traditional real-time services like Discord and Zoom prioritize fast delivery of experiences over intelligently processing the content within. This makes these frameworks poorly suited for the age of AI and foundation models. Existing foundation model vendors focus disproportionally on throughput for use cases like code editing and writing assistance, rather than latency. Streaming functionalities are limited to poorly designed text-based user interfaces, which lack support for multimedia content delivery. Autoregressive models are more malleable to streaming and real-time applications and do not have to necessarily follow this interface, which allows a rich area of academic exploration, engineering, optimization, and commercialization.

In various embodiments, core component 102 can build the infrastructure that prepares foundation models for next-generation interfaces that communicates rich multimedia and structural information in real-time. Core component's Software Development Kits ("SDKs") enable fast, on-device (real world) and in-game-engine (virtual worlds) intelligence. Core component 102 can be both programming-language-agnostic and cloud agnostic. This means that servers can be deployed globally, close to clients, in order to further reduce latency. Core component 102 can also be partially language-model-agnostic; one could replace the language model(s) used in core component 102 with their own and still achieve similar performance.

Embodiments of the OS use agent 104 as the core intelligence technology, and core component 102 for content delivery. Additionally, several other language models can be deployed in production for the system's customers. Core component 102 can be deployed on specialized hardware.

According to the embodiments, Core component's servers have access to various computational resources, including multi-core Central Processing Units ("CPUs") and specialized accelerators such as Graphic Processing Units ("GPUs") and Tensor Processing Units ("TPUs"). Core component 102 can use off-the-shelf and proprietary solutions to deliver responses from a data center. Core component's clients only handle multimedia stream processing logic or user UI/UX logic like text display or audio playback. This provides high compatibility across different hardware, easy deployment, and the potential to run on low-powered edge devices with proper network connection and I/O devices.

Since inputs are received in a streaming fashion, the realized latency can be effectively hidden with aggressive pipelining, speculative execution of faster, less powerful models, as well as caching. Interactions through a single session of core component 102 are isolated with respect to each other, allowing easy load balancing and autoscaling.

The operations of core component 102 and agent 104 are discussed in detail below.

Figure 2:
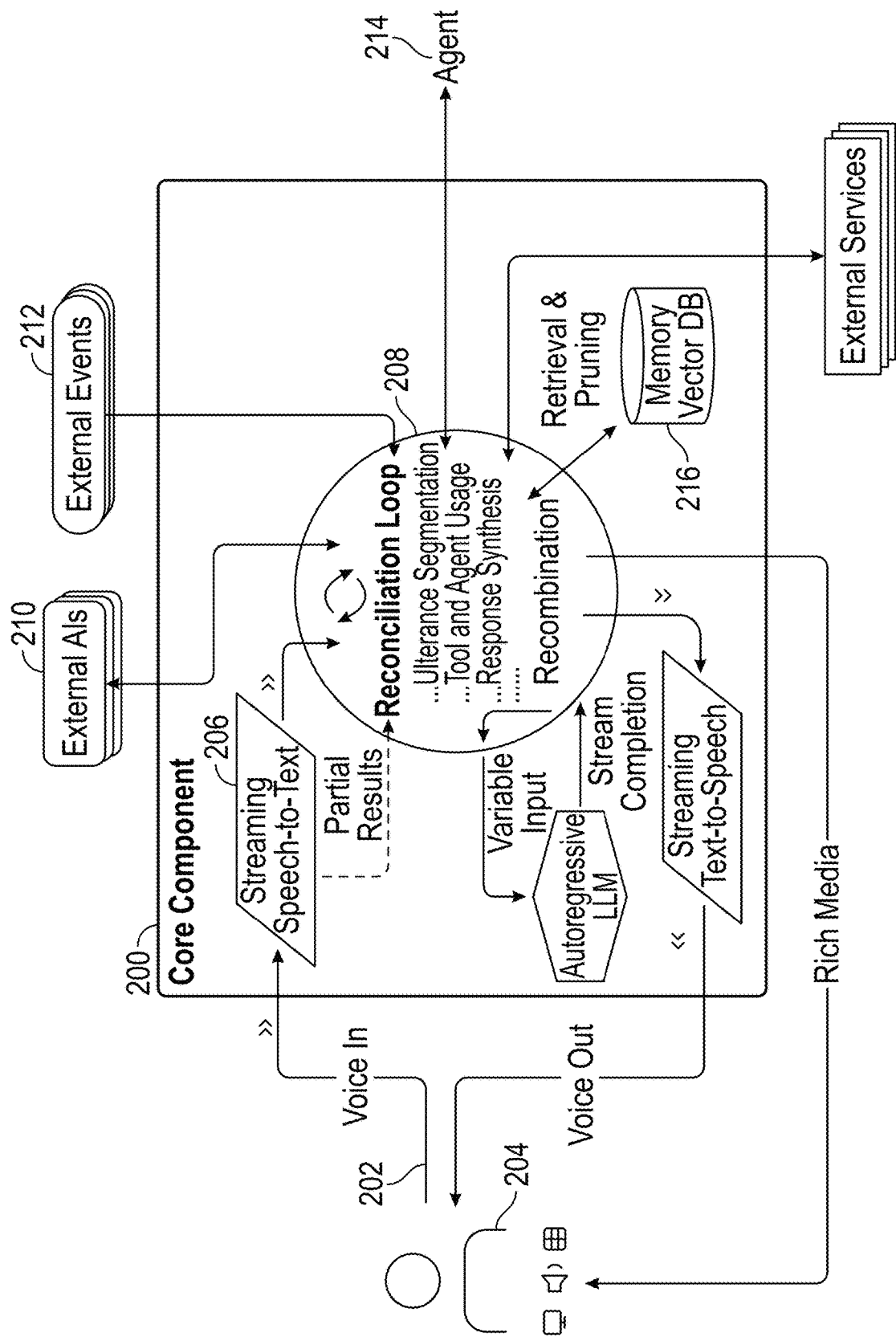
FIG. 2 is a diagram illustrating an exemplary operation of the core component of the operating system, according to an embodiment of the disclosure.

FIG. 2 is a diagram illustrating an exemplary operation of the core component 200, according to an embodiment of the disclosure. Core component 200 can be a real-time, multimedia, and multi-agent infrastructure for Large Language Models ("LLMs"). The main interface between client 204 and core component 200 can be voice (audio), along with rich bidirectional media exchange 202 ranging from text and video to structured data. In this embodiment, user input is voice or audio based (e.g., voice commands). The voice/audio based user input is converted to text via a streaming speech to text processor 206.

In contrast to the traditional request/response and linear interaction in LLM services, core component 200 can operate in a long-running loop 208 that continuously receives, processes, and returns information, simulating natural human interactions. In some embodiments, an AI powered by core component 200 can interrupt a user, spontaneously initiate a conversation with a human, or engage in back-and-forth dialogue. This can provide an immersive environment for users to interact with AI-powered characters. In addition to the basic chat functions provided by existing AI systems such as ChatGPT, embodiments of the system can actively monitor user conversations and initiate, based on information extracted from the user conversations, a dialog with the user without having first receiving an explicit input or command from the user. This allows the system to be "human-like."

In the embodiment illustrated in FIG. 2, once in text format, the user input is processed in a reconciliation loop 208 of core component 200. (Step 103) In the embodiments where user input is already in text format, the user input can be streamed to the reconciliation loop 208 without first being converted from audio to text. In the embodiments where user input is in video format, a video to text conversion can be performed to extract user input from the video. The text generated from the conversion can be streamed to the reconciliation loop 208.

The reconciliation loop 208 refers to a constantly updating long-running loop process that core component 200 is running. Core component 200 can constantly receive updates from other core component replicas, other AI services 210, or state changes from external services 212, and generate a response accordingly. Specifically, the reconciliation loop 208 process includes utterance segmentation (e.g., dividing the speech data to extract user's intention), tool and agent usage (e.g., using tools and agents to better produce output), and response synthesis (e.g., generating a response to the user based on output from the one or more agents 214).

To run the reconciliation loop 208, core component 200 can constantly receive updates from other core component replicas, other AI services (e.g., external AIs) 210, or state changes from external services (e.g., external events such as an application protocol interface ("API") call of a long polling nature) 212, and generate a response accordingly.

Core component 200 can optionally include a multimodal memory system based on vector databases 216 to improve the recognition quality of speech-to-text services (with either echo cancellation or speaker diarization) and LLMs. The memories 216, which can consist of raw captured sounds, transcripts and external tool and agent invocations, are persistent. They are constantly pruned and optimally retrieved and presented to the components in core component 200.

As an example, if the user's audio input is "buy 3 tickets to see Barbie Friday night," core component 200 can first perform a speech-to-text conversion and then feed the converted input in text format to the reconciliation loop 208. While in the reconciliation loop 208, the text input can be processed using external AIs 210 to determine the user's intention (i.e., buy tickets to see the movie "Barbie" on Friday night). Once that determination is made, core component 200 can select one or more of agents 214 to interact with products/services on the internet or in the real world to meet the user's intentions. Core component 200 can interact with multiple agents 214 in the system. In this example, core component 200 can select the agent specialized in working with movie ticket reservation apps over the Internet.

One optimization technique in core component 200 involves operating on autoregression itself. This technique involves feeding partial transcripts from speech-to-text into the language model before the utterance segmentation has determined the end of the user's request. The streaming outputs from the language model are continuously recombined and reconciled with new transcripts streaming in, as well as other updates from external events and services. This approach effectively hides latency and results in dramatically shorter response times for the user.

Figure 3A:
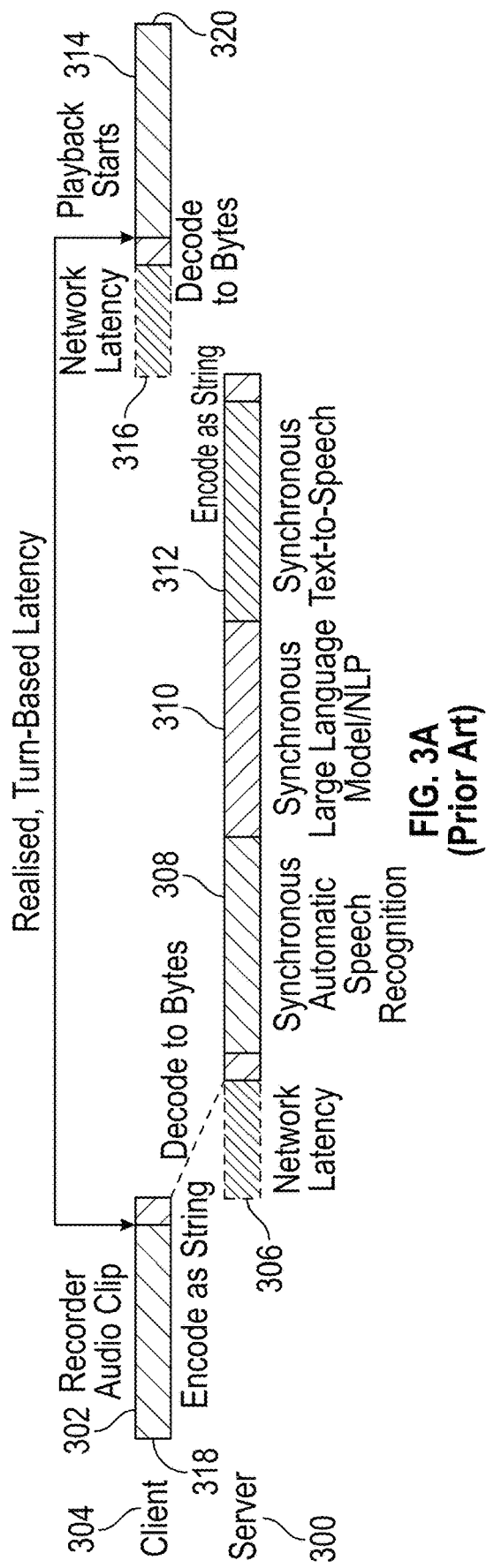
FIGS. 3A and 3B illustrate the difference in performance between the processing done by a traditional system versus an embodiment of the core component operating on autoregression itself.
Figure 3B:
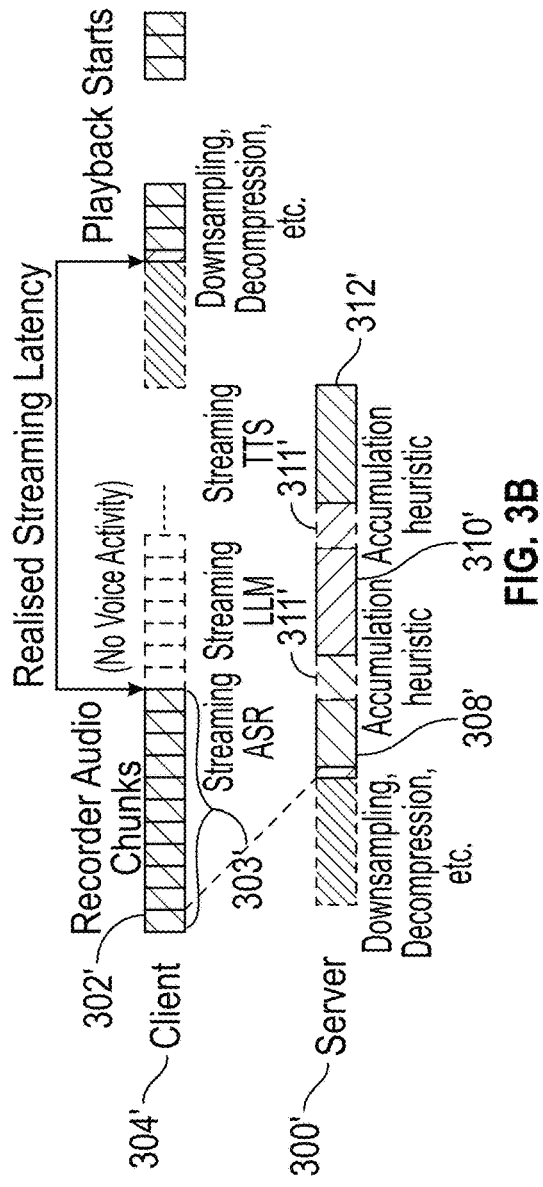

FIGS. 3a and 3b illustrate the difference in performance between the processing done by a traditional system versus an embodiment of core component 200 operating on autoregression itself.

FIG. 3a illustrates the process of converting a series of audio clips to text using methods employed by traditional AI voice chat. In this process, server 300 does not initiate synchronous automatic speech recognition on a first recorder audio clip 302 until the full clip 302 is transmitted from the client 304 to the server 300. If the clip 302 is encoded, the server 300 needs to decode the encoded clip before performing synchronous automatic speech recognition on the decoded clip. There is typically network latency 306 involved during the transmission between the client 304 and the server 300. The server 300 performs synchronous automatic speech recognition 308 and synchronous LLM natural language processing ("NLP") 310 on the audio clip to extract the content of the clip. After performing the necessary operations based on the content, the server can generate an output in text format and perform synchronous text-to-speech processing 312 on the output. After the text-to-speech processing 312 is completed, the output audio clip can be encoded and transmitted to the client 304, which decodes the encoded clips and starts playback 314. Additional network latency 316 may occur before the playback starts. As illustrated in FIG. 3a, there is hardly any overlap in the processing done by the server 300 and the processing performed by the client 304. All steps in the process are done in series. This results in significant delays in the response time between a user input is received 318 and an output is played back to the user 320.

In some embodiments of this disclosure, the voice inputs are received in a streaming fashion, the realized latency can be effectively hidden with aggressive pipelining, speculative execution of faster, less powerful models, as well as caching. Referring to FIG. 3b, both server 300' and client 304' are part of the core component. The client 304' can divide up the recorder audio clip 302' into audio chunks 303' and transmit the audio chunks 303' one by one to the server 300'. This allows the server 300' to start processing the recorder audio chunks 303' before the client 304' finishes processing the whole audio clip 302'. In this embodiment, the server 300' can perform streaming automatic speech recognition 308' and streaming LLM 310' on the chunks. These steps can include accumulation heuristic 311' to improve performance. When a text output is generated, the server 300' performs streaming text-to-speech processing 312' on the output to generate an audio output. The audio output is then transmitted to the client 304' in a streaming fashion and played back immediately chunk by chunk. By performing many of the steps in a streaming fashion, the client 304' and the server 300' can perform at least some of their work in parallel. As such, the streaming latency in core component's response (in FIG. 3b) can be significantly shorter than the turn-based latency in the traditional system's response (in FIG. 3a).

Embodiments of the core component provide an end-to-end platform with a simple interface that is suitable for the increasing proliferation in client platforms, such as browsers, IoT devices, and game engines. In some embodiments, the core component can be deployed on specialized hardware. In some embodiments, the core component is not coupled to any specific LLM. In some embodiments, all processing is done on the cloud, the core component is lightweight and has minimal computing power requirements for the client.

Details of the operation of an agent will be discussed in the paragraphs below.

Agents of the disclosed operating systems are designed to understand user intent based on output from the core component of the system. Agents are also designed to automatically search, filter, and combine information to present as knowledge, and interact with products and services on the internet and in the physical world through imitation. In some instances, agents can represent experts and professionals in various fields who talk, think, and act like humans. Agents are capable of taking natural language inputs and requests from end users, offering solutions for content demands.

Figure 4A:
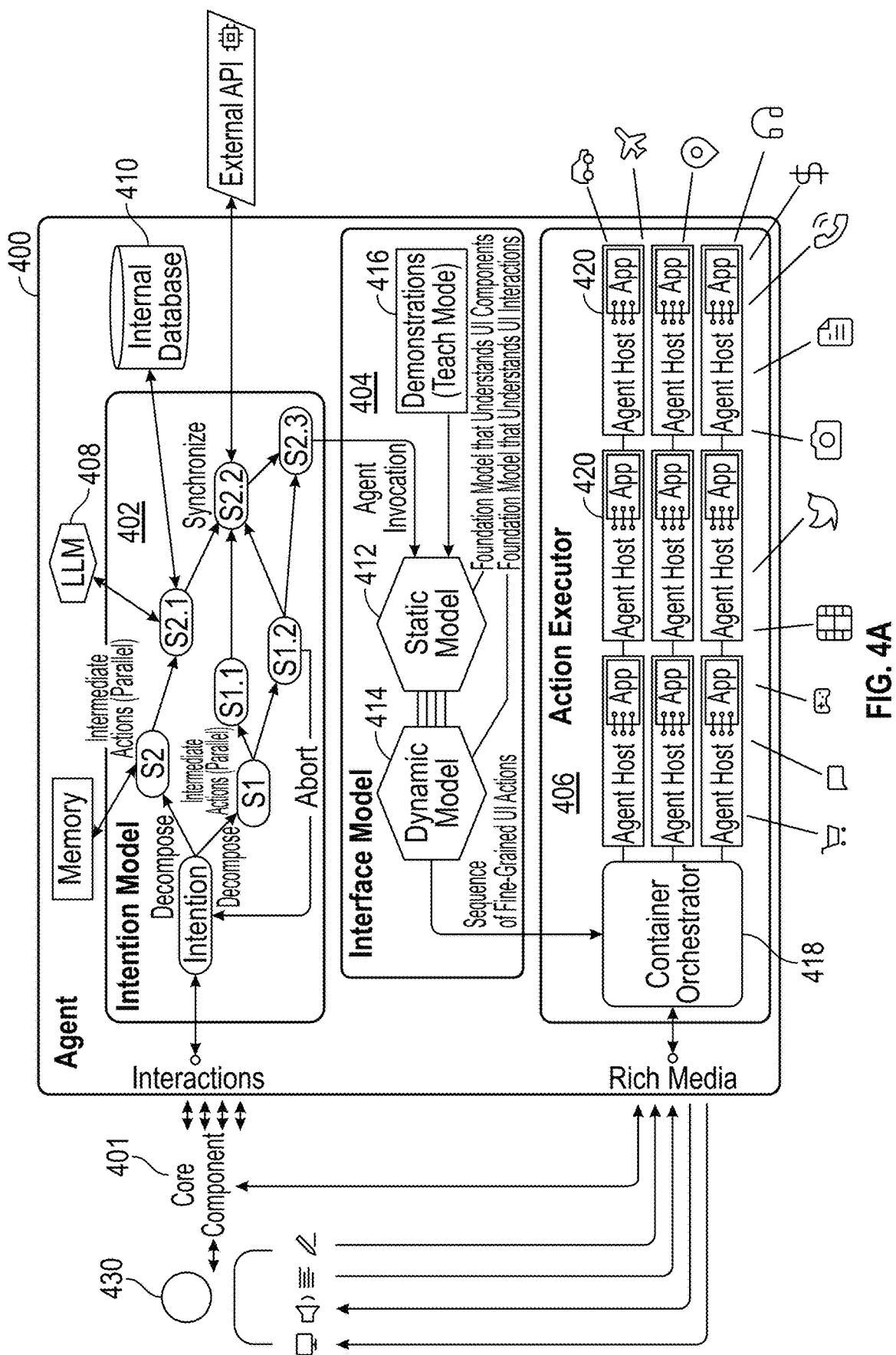
FIG. 4A illustrates the exemplary operation of an agent, according to an embodiment of the disclosure.

In the embodiment illustrated in FIG. 4a, agent 400 can include three modules, an Intention Model 402, an Interface Model 404, and an Action Executor 406.

The Intention Model 402 translates high-level user intentions into fine-grained actions, without requiring explicit step-by-step or chained execution instructions list existing technologies. To enrich user intentions, the Intention Model 402 can have access to a memory system based on vector databases, and a customized re-ranker, to infer additional context requests that are too terse to be informative.

In one embodiment, a finite-state-machine-based framework is developed. This framework constantly assigns bite-size tasks to different language-model-powered algorithms some of which use agents, others use APIs, others retrieve data from internal databases, and others purely synthesize conversation results. The framework provides four available actions: 1) Decompose: the current intention requires the launching of multiple parallel subtasks; 2) Synchronize: the current intention requires summarizing the results of multiple running subtasks; 3) Report: the user's intention may be partially satisfied by presenting intermediate information; and 4) Finalize/Abort: The user's intention has changed such that the current tasks are no longer applicable, or the user's intention has been satisfied.

Referring to FIG. 4a, in operation, first, the output form core component 401 is received and processed by the Intention Model 402 of agent 400. In this example, the Intention Model 402 decomposes the output from core component 401 to launch multiple running intermediate actions (or tasks) (e.g., S1, S2). If needed, the intermediate actions can be further decomposed into subtasks (e.g., S1.1, S1.2, S2.1). Each of the intermediate tasks and subtasks can be assigned to one or more language-model-powered algorithms 408 for processing. The tasks and subtasks can also retrieve data from internal databases 410. The results of the multiple running subtasks (e.g., S1.1, S1.2, S2.2) can be synchronized (e.g., S2.2) In some embodiments, the synchronizing of the subtask results is done by using external API(s). As illustrated in FIG. 4a, some results from the subtasks (e.g., S1.2) can also synthesize conversation results without being synchronized with results from other subtasks. If the user's intention has changed such that the current tasks are no longer applicable, agent 400 can abort the subtask (e.g., S1.2). If the user's intention has been satisfied, at least partially, the Intention Model 402 can finalize and present intermediate information (e.g., S2.3) to the Interface Model 404 of agent 400.

Figure 5:
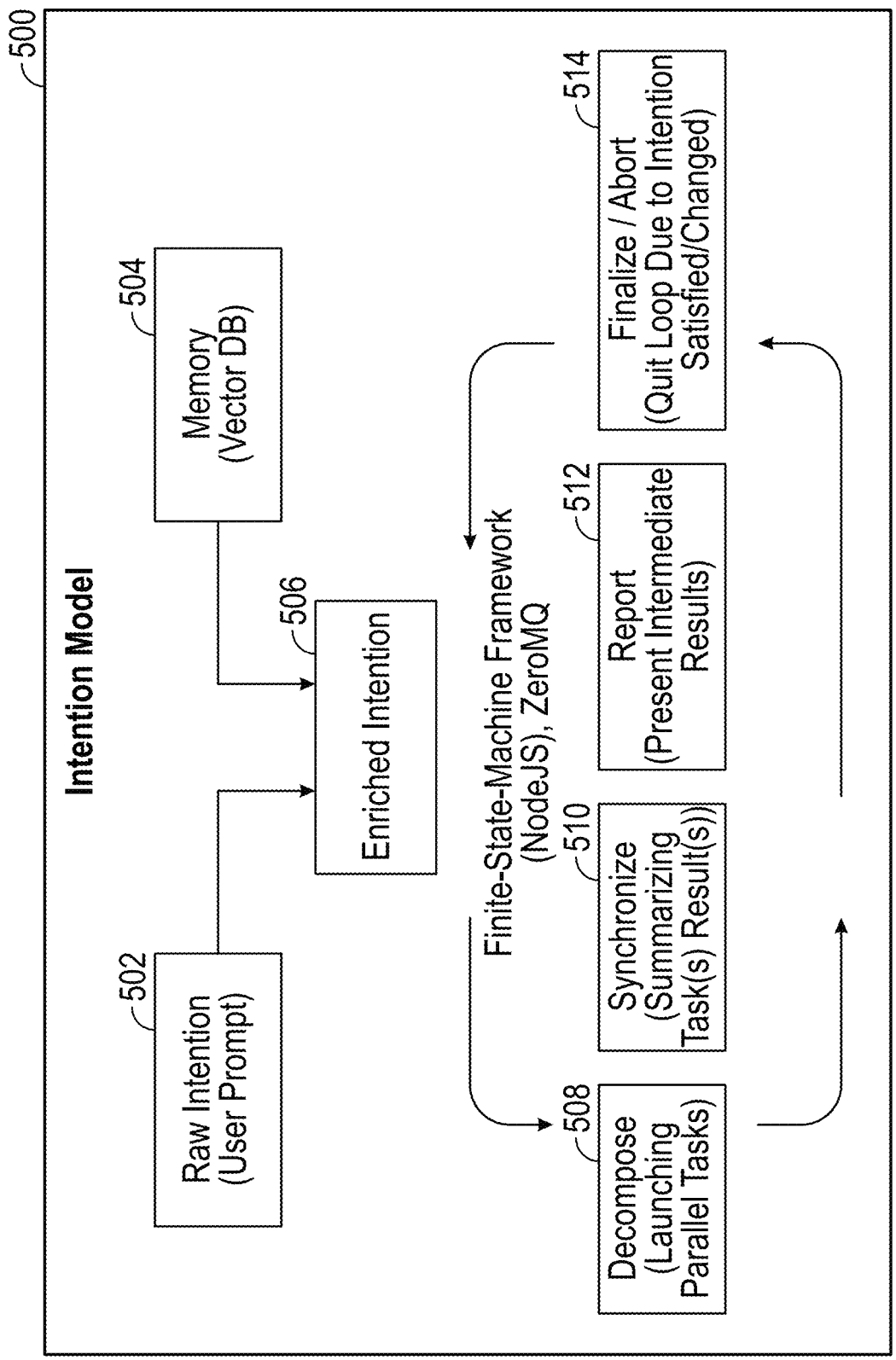
FIG. 5 is a diagram illustrating the exemplary operation of the Intention Model of an agent, according to an embodiment of the disclosure.

FIG. 5 is a diagram illustrating the exemplary operation of the Intention Model 500, according to an embodiment of the disclosure. Raw intention (e.g., user prompt) 502 in combination with input from a memory (e.g., vector database) 504 can produce enriched intention 506. Using a finite-state-machine framework, the Intention Model 500 can decompose the enriched intention 506 into multiple running tasks (or intermediate tasks which can be further decomposed) 508, synchronize the results from the tasks 510, report the synchronized intermediate results 512, and finalize and the results to be sent to the Interface Model 500 if the intention has been satisfied 514. Alternatively, if the user's intention has changed such that the current tasks are no longer applicable, Intention Model 500 can abort the subtask 514.

Referring back to FIG. 4*a*, the Interface Model 404 translates requests from the Intention Model 402 into a sequence of fine-grained user interface (UI) actions on target apps. The Interface Model 404 is composed of two foundation sub-models: the Static Model 412 and the Dynamic Model 424.

The Static Model 412 is designed to understand UI components, such as buttons, links, sliders, scrollbars, etc. Like a human user seeing the UI of an app, Static Model 412 can identify the salient elements on the UI and assign digital semantics to them (e.g., button could be pressed to trigger something). Specifically, Static Model 412 includes the following layer: Input Layer for handling user inputs, like cursor, typing, clipboard, etc.; and View Layer for handling UI elements (buttons, links, etc.) and their behaviors.

Dynamic Model 414 can understand UI interactions and the underlying operations that occur when a UI action is completed. This can include the presentation of new information, playing a song, or placing an order. Dynamic Model 414 can learn how a digital app affects the physical world. In one embodiment, Dynamic Model 414 can include the following layers. First is an Entity Layer for recognizing the entities being manipulated by the app, the relationship between these entities, and the attributes on them. For example, a song track entity could be an entity in the Spotify app, and a current track stats can be an attribute on the player entity. Second is a Transition Layer for extracting all available operations on the recognized entities. For example, the Spotify app offers an operation to set the current track attribute to another song via a button. Third is the Semantics Layer for assigning physical semantics to operations and entities. For example, the current track attribute really means the song being streamed to the end user.

As illustrated in FIG. 4*a*, the Static Model 412 and Dynamic Model 414 of the Interface Model 404 can perform UI action on target applications based on the intermediate information received from the Intention Model 402. In this embodiment, the Interface Model 404 can be trained from demonstrations 416 provided by users, as well as workflows. Demonstrations 416 can take the form of a video recorded form native applications or a browser session that includes the document object model ("DOM") change stream. The training data can originate from an end user or an external labeling force.

Figure 4B:
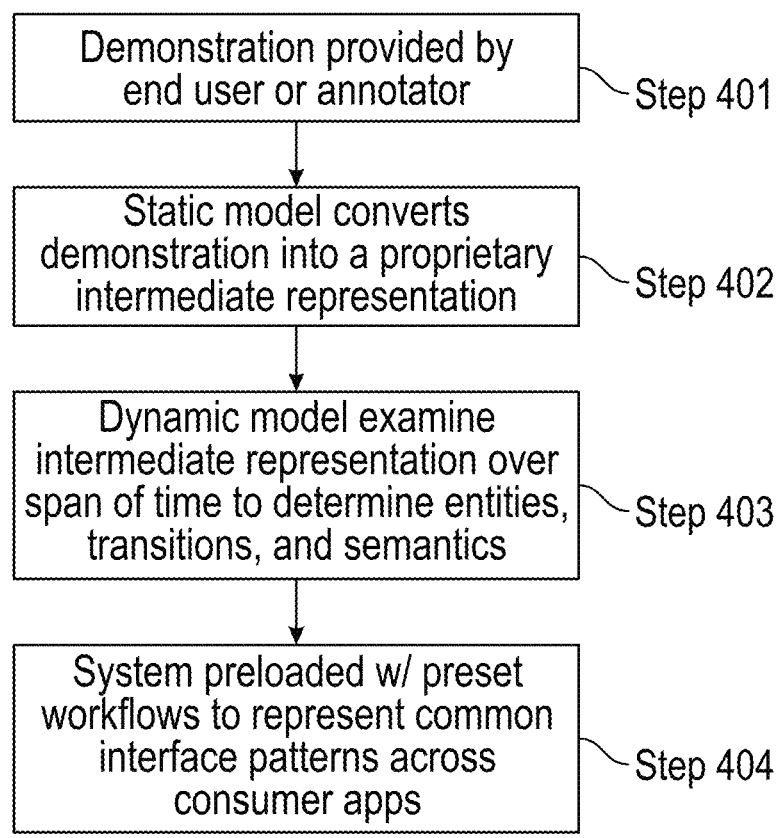
FIG. 4B is a flowchart illustrating the exemplary steps of training the Interface Model using demonstrations, according to an embodiment of the disclosure.

FIG. 4*b* illustrates the exemplary steps in the training of the Interface Model 404 using demonstrations 416, according to an embodiment of the disclosure. First, a demonstration is provided by either an end user or an annotator. (Step 401) The demonstration can be in the form of structured (e.g., DOM change-stream) or unstructured (e.g., video recording). In some embodiments, the demonstration recordings can include additional information.

Demonstrations can be produced using specialized infrastructure and environment. For end users, the infrastructure and environment can be a web application that is developed specifically for producing the demonstrations. For annotators, the infrastructure and environment can be another web application. The accuracy of the Intention Model can be ensured by spinning up clean recording environments. The clean recording environments can also resolve data privacy concerns (e.g., there is no unwanted access into an end user's device, and the end user is aware that what he is doing is being recorded, on a clean, anonymized environment").

After the demonstration is received, the Static Model 412 can convert them into a proprietary intermediate representation (IR) with UI definition, classification, VRD, etc. (see FIG. 6). (Step 402) As an example, the Static Model 412 can identify the calendars used across applications that allow a user to select a start date and an end date.

Figure 6:
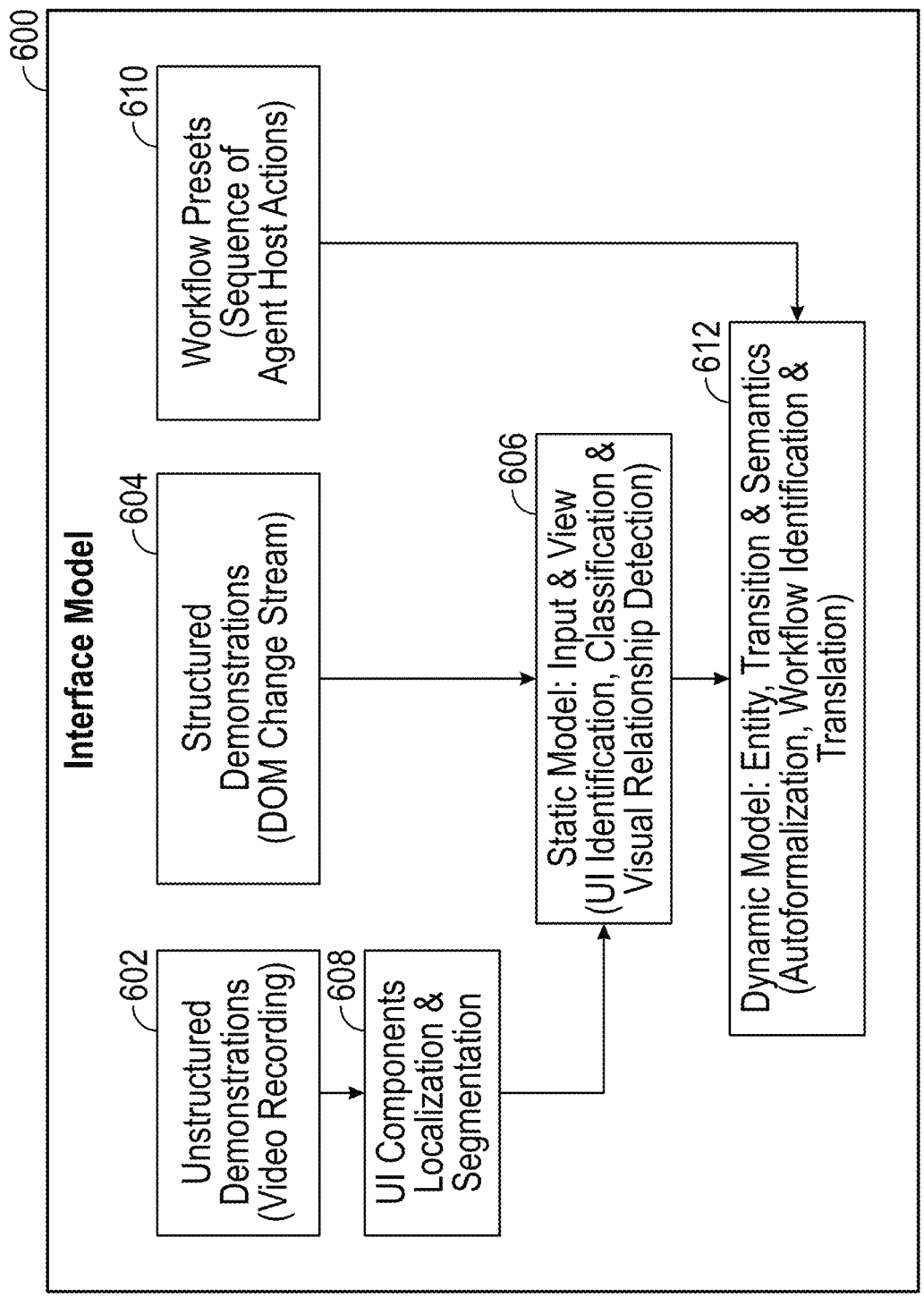
FIG. 6 is a diagram illustrating the exemplary operation of the Interface Model of an agent, according to an embodiment of the disclosure.

Next, the Dynamic Model 414 examines the IR over the span of time to determine the entities, transitions, and semantics (see FIG. 6). (Step 403) That is, the Dynamic Model 414 determines what the UI means, how the UI transforms, and what the UI represents in the inherent state of this application. This is inherently a reverse-modeling effort of the applications. An example is all the different ways that one can "configure" some SKU at a vendor have a similar flow of actions (e.g., setting the ice and sugar level of a beverage at an online delivery app or choosing the memory size and color of a consumer hardware at an eCommerce store).

Finally, the system is preloaded with a huge set of preset workflows to represent common interface interaction patterns across consumer apps. (Step 404) As such, at any point in this process, if the Interface Model 404 decides that what is shown in the demonstration is similar enough to a preset, the model 404 can make "a shortcut" and return the preset that has been identified.

Referring back to FIG. 4*a*, the dynamic model 414 uses an auto-formalization process of creating a formalized system that approximates the observed UI interactions. The Interface Model 404 can be equipped with a large set of workflows, which are defined as a known sequence of UI actions across a series of applications. These workflows can be robust up to minor adjustments of UI components. In one embodiment, for most high-frequency consumer-facing cases, there are at most 50-60 distinct workflows within an application, even for complex actions that require using multiple apps. The dynamic model 414 can first attempt to assign a request to an existing workflow before falling back to auto-formalization. Interface Model 404 is the key for the OS to learn to see the web and interact with the applications on the web as a human would.

FIG. 6 is a diagram illustrating the exemplary operation of the Interface Model 600, according to an embodiment of the disclosure. First, unstructured demonstrations (e.g., video recording) 602 and structured demonstrations (e.g., DOM change stream) 604 are fed into the Static Model 606 of the Interface Model 600. These demonstrations can be generated by the end-users directly, or could originate from external labeling forces. Unstructured demonstrations may go through UI component localization and segmentation 608 before being sent to the Static Model 606. Static Model 606 performs UI identification, classification and visual relationship detection on a target app. Based on the output from the Static Model 606 and workflow presets (e.g., sequency of Agent Host actions) 610, Dynamic Model 612 of the Interface Model 600 can perform auto-formalization, workflow identification and translation to enable interaction with the target application.

Referring back to FIG. 4, agent 400 also includes an Action Executor 406 that executes all the actions with one or more apps on the web based on the sequence of UI actions generated by the Interface Model 404. Action Executor 406 can include a Container Orchestrator 418 and one or more Agent Hosts 420.

Container Orchestrator 418 is responsible for spawning, managing, and interacting with one or more Agent Hosts 420. It can allocate computing resources to Agent Host(s) 420 according to the nature of the apps. It can act as the bridge connecting the containerized apps and the outside. In one embodiment, Container Orchestrator 418 can be implemented based on Kubernetes clusters and alternative workload orchestrators. In addition, Container Orchestrator 418 enables autoscaling of the agents, making it capable of handling multiple users and multiple agents per user, without any minimum computer requirements on the user's platform.

An Agent Host 420 is a containerized environment for running an arbitrary app. Agent Host 420 can power the app directly, as if the Agent Host 420 were a real device, without modifying the app itself. Agent Host 420 can emulate the signature of a user device, such as login session, IP, request header, etc. Agent Host 420 can send UI actions to the app and collect all UI signals (video, audio, DOM change stream) from the app, just like a human would. UI actions can come from either the Interface Model 404 or the end user. Similarly, UI signals may be sent back to the Interface Model 404 or streamed back to the end user 430. From the app's perspective, it is impossible to distinguish between the two. Agent Host 420 can be implemented as a Docker container, a Virtual Machine (VM), or through any alternative virtualization technologies.

Figure 7B:
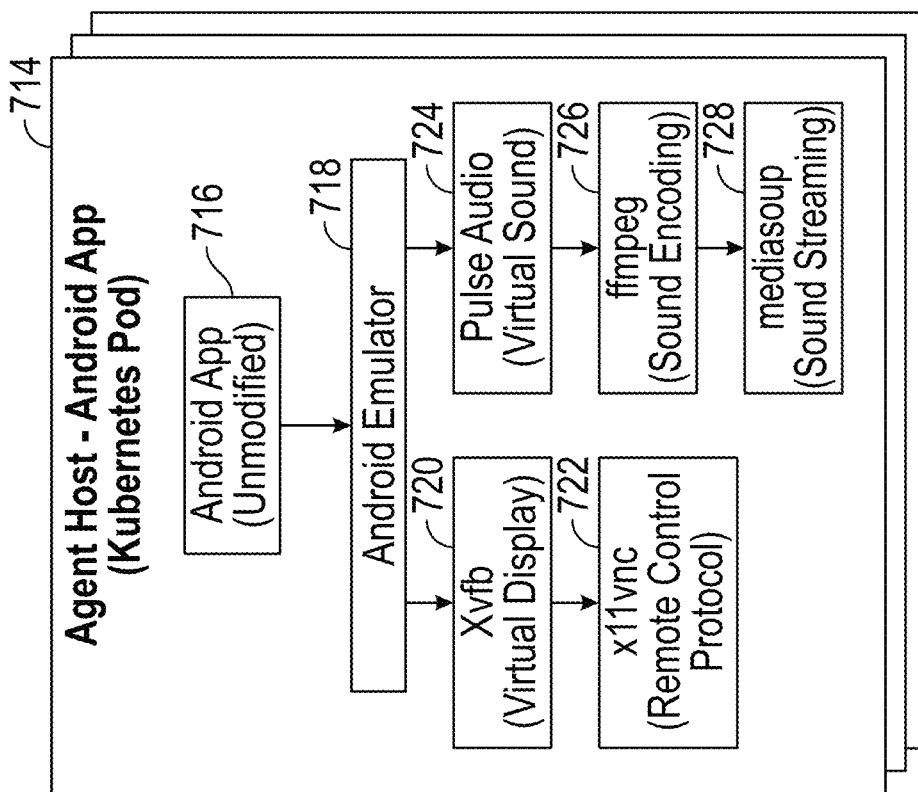
FIGS. 7A-7D illustrate exemplary Agent Hosts interacting with apps running on different operating systems, according to an embodiment of the disclosure.
Figure 7A:
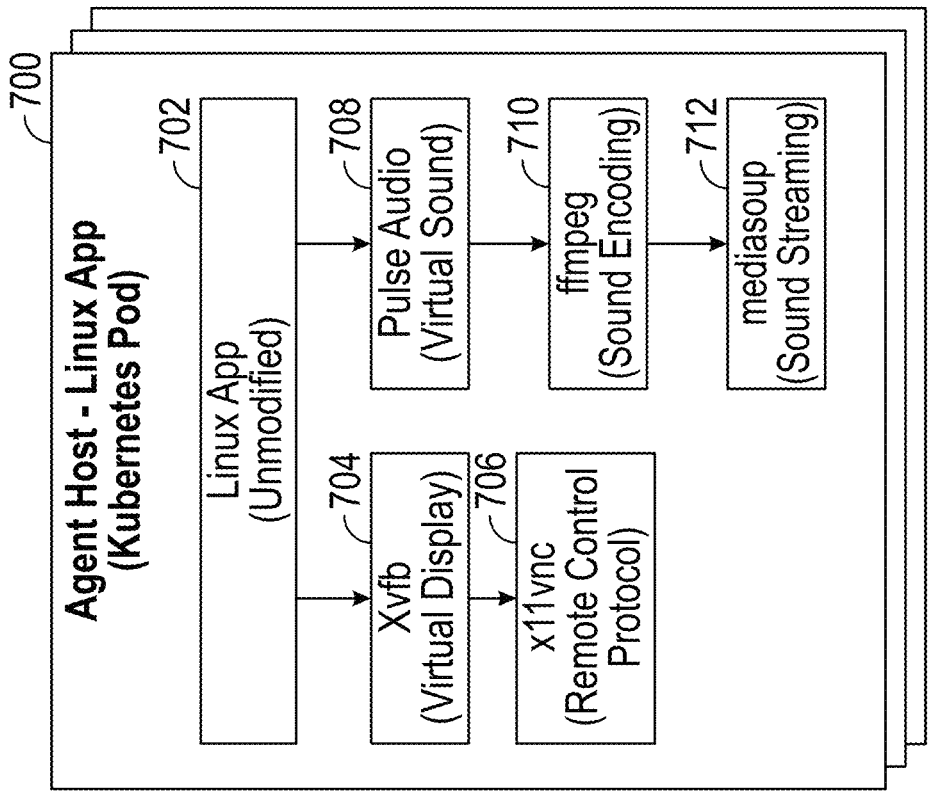

FIGS. 7a-7d illustrate exemplary Agent Hosts interacting with apps running on different operating systems, according to an embodiment of the disclosure. FIG. 7a illustrates an Agent Host 700 interacting with a Linux app 702 using various tools such as Xvfb 704 for virtual display, xl lvnc 706 for remote control protocol, PulseAudio 708 for virtual sound, ffmpeg 710 for sound encoding, and mediasoup 712 for sound streaming.

FIG. 7b illustrates an Agent Host 714 interacting with an Android App 716 using similar tools 720, 722, 724, 726, 728 as those used by the Agent Host 700 of FIG. 7a with the addition of an Android emulator 718 as an interface between the Android app and the various tools.

Figure 7D:
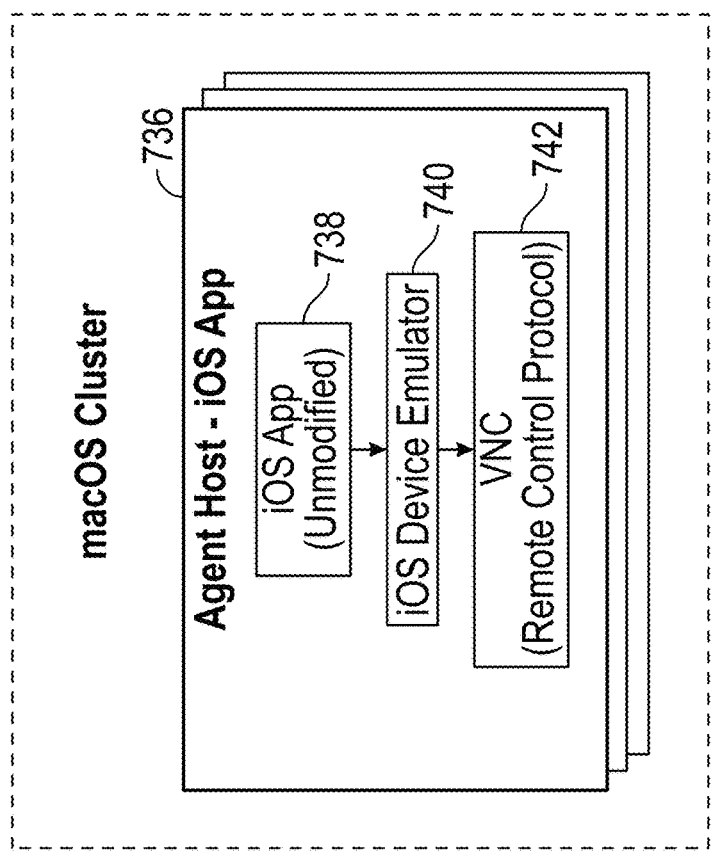
Figure 7C:
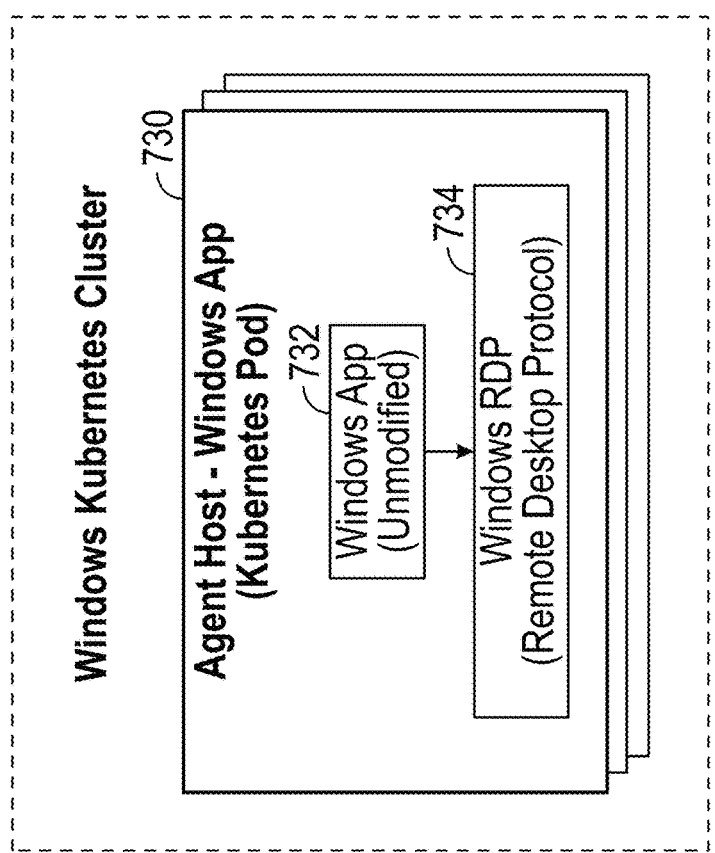

FIG. 7c illustrates an Agent Host 730 interacting with a Windows App 732 using Windows RDP 734 as the remote desktop protocol.

FIG. 7d illustrates an Agent Host 736 interesting with an iOS App 738 using an iOSdevice emulator 740 and VNC 742 as the remote control protocol.

It should be understood that multiple Agent Hosts can interact with multiple apps on one or more operating systems. The Container Orchestrator can allocate computing resources to each Agent Host according to the nature of the app with which the Agent Host is interacting.

All of the methods and tasks described herein may be performed and fully automated by a computer system. The computer system may, in some cases, include multiple distinct computers or computing devices (e.g., physical servers, workstations, storage arrays, cloud computing resources, and mobile devices, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A system comprising at least one agent, the agent comprising:
    an intention model configured to
        receive, from a core component, an output comprising raw user intention of a user;
        combining the raw user intention with an input from a memory to produce enriched user intention; and
        translate the enriched user intention into a plurality of actions without receiving explicit step by step execution instructions from the user by
            decomposing the output to one or more tasks;

assigning each of the one or more tasks to a corresponding language- model-powered algorithm for processing;

synchronizing results from the processing of the one or more tasks by continuously recombining and reconciling the results; and finalizing and presenting to an interface model intermediate information from the synchronized results;

the interface model in communication with the intention model and configured to translate the intermediate information into a sequence of user interface (UI) actions on one or more target applications; and an action executor in communication with the interface model and configured to execute the sequence of UI actions on the one or more target applications.

2. The system of claim 1, wherein the intention model is configured to have access to a memory system based on vector databases, and a customized re-ranker, to infer additional context requests.

3. The system of claim 1, wherein the interface model comprises:

a static model configured to understand UI components of an application; and a dynamic model configured to understand interactions among the UI components and operations that occur when a UI action is completed.

4. The system of claim 3, wherein the static model comprises:

an input layer configured to handle user inputs; and a view layer configured to handle the UI components and actions associated with the UI components.

5. The system of claim 3, wherein the dynamic model comprises:

an entity layer configured to recognize entities being manipulated by an application, a relationship between entities, and attributes of the entities;

a transition layer configured to extract all available operations on the recognized entities; and a semantics layer configured to assign physical semantics to operations and entities.

6. The system of claim 3, wherein the interface model further comprises a demonstration model configured to train the interface model using a video of operating the application or a browser session comprising the document object model change stream.

7. The system of claim 6, wherein the demonstration model uses an auto-formalization process of creating a formalized system that approximates observed UI interactions.

8. The system of claim 1, wherein the interface model comprises workflow presets; and wherein the system is preloaded with the preset workflows to represent common interface interaction patterns across a plurality of apps.

9. The system of claim 1, wherein the action executor comprises:

a container orchestrator; and one or more agent hosts;

wherein the container orchestrator is configured to spawn, manage, and interact with one or more agent hosts; and wherein each of the one or more agent hosts comprises containerized environment for running an application.

10. The system of claim 9, wherein the container orchestrator is configured to allocate computing resources to the one or more agent hosts according to nature of the apps.

11. The system of claim 9, wherein the container orchestrator is implemented based on Kubernetes clusters and alternative workload orchestrators.

12. The system of claim 11, wherein each of the one or more agent hosts is configured to send UI actions to the application and collect UI signals from the application.

13. The system of claim 12, wherein the UI signals comprise one or more of video, audio, DOM change stream from the application.

14. The system of claim 12, where the UI actions are received from either the interface model or the user.

15. The system of claim 12, wherein each of the one or more agent hosts comprises one of a Linux App, an Android App, a Windows App, and a iOS App.

* * * * *